Sept. 7, 1943. S. R. CUMMINGS Re. 22,370
SUCTION CLEANER
Original Filed May 24, 1934 3 Sheets-Sheet 1
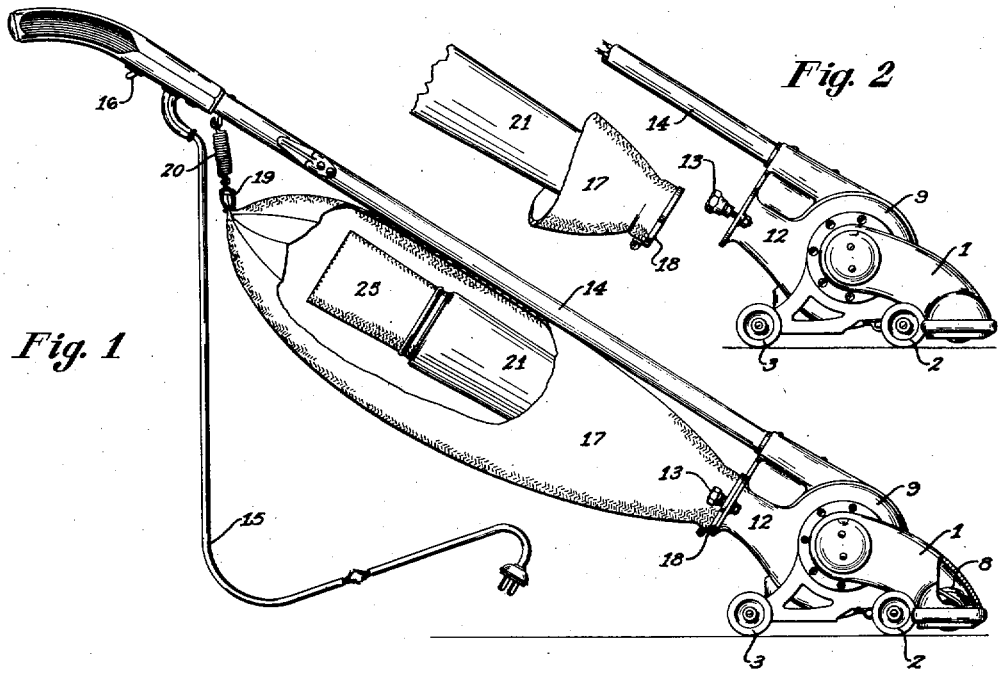
Fig. 1
Fig. 2
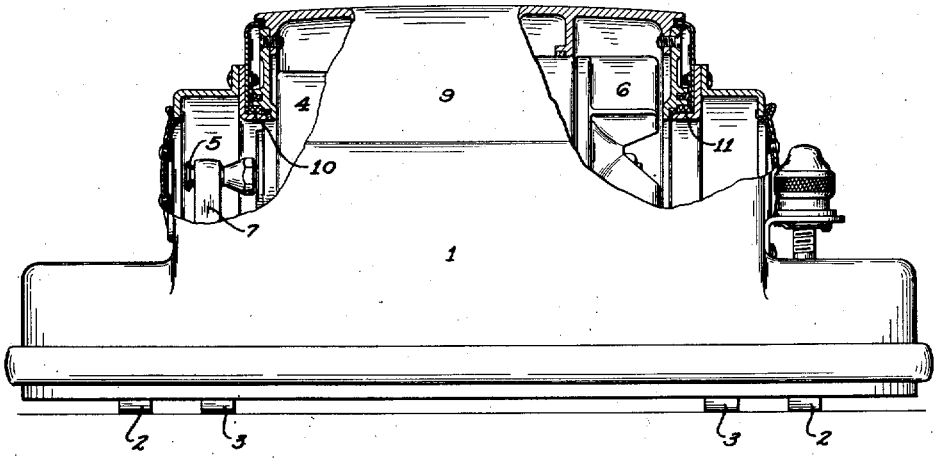
Fig. 3
INVENTOR
Stanley R. Cummings
BY
Harry S. Duncan
ATTORNEY Sept. 7, 1943. S. R. CUMMINGS Re. 22,370

SUCTION CLEANER

Original Filed May 24, 1934 3 Sheets-Sheet 2

INVENTOR

Stanley R. Cummings

BY

Harry S. Demarest

ATTORNEY

Sept. 7, 1943. S. R. CUMMINGS Re. 22,370

SUCTION CLEANER

Original Filed May 24, 1934 3 Sheets-Sheet 3

INVENTOR

Stanley R. Cummings

BY

Harry S. Bruerse

ATTORNEY

Reissued Sept. 7, 1943

Re. 22,370

UNITED STATES PATENT OFFICE 22,370

SUCTION CLEANER

Stanley R. Cummings, Canton, Ohio, assignor to The Hoover Company, North Canton, Ohio, a corporation of Ohio Original No. 2,095,466, dated October 12, 1937, Serial No. 727,220, May 24, 1934. Application for reissue April 5, 1939, Serial No. 266,233

12 Claims. (Cl. 15—16)

The present invention relates to suction cleaners in general and particularly to new and novel improvements in means to reduce the noise of cleaner operation. More specifically the invention comprises a suction cleaner in which no relative movement takes place between the cleaner exhaust outlet, the cleaner dust bag, the cleaner handle, and a rigid muffler element.

It is an object of the present invention to provide a new and improved suction cleaner. It is another object of the invention to provide a suction cleaner which operates with a minimum of noise. A still further object is the provision of a suction cleaner having a muffler which extends within the cleaner dust bag and which expands therein. It is another object of the invention to provide a muffler in a suction cleaner, the muffler being provided with an auxiliary outlet to permit heavy particles which will not travel the complete length of the muffler to fall therethrough into the dust bag. These and other more specific objects will appear upon reading the following specification and claims, and upon considering in connection therewith the attached drawings to which they relate.

Referring now to the drawings:

Figure 1 is a side view of the suction cleaner constructed in accordance with the present invention, certain parts being broken away;

Figure 2 is a partial side view of the cleaner with the bag and muffler unit removed therefrom;

Figure 3 is a front elevation certain parts being broken away, of the body of the cleaner shown in Figure 1;

Figure 4:
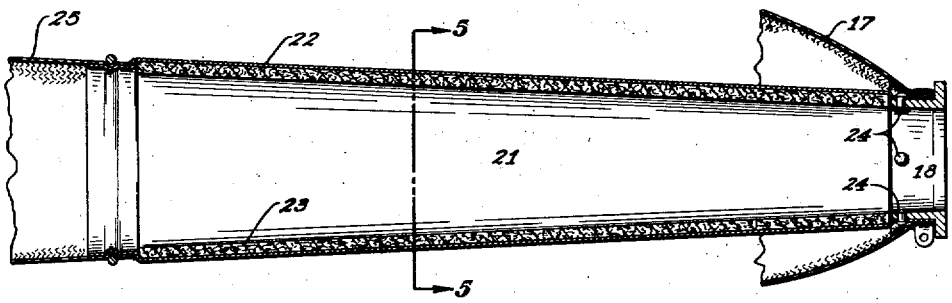
Figure 4 is the cross-section through the muffler element per se.
Figure 5:
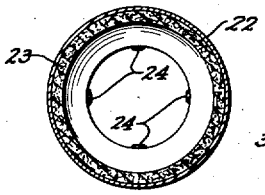
Figure 5 is a cross-section upon the line 5—5 Figure 4.

Noise of operation is an important factor in cleaner operation. In the suction cleaner construction in accordance with the present invention means have been provided to reduce the noise created by the high speed passage of cleaning air through the cleaner. These means comprise an elongated expanding muffler which is secured, either removably or permanently, at the exhaust outlet of the cleaner and which extends within the cleaner dust bag. The use of this type of cleaner muffler is made possible by combining it with a new and novel cleaner construction in which no relative movement takes place between the cleaner handle and the cleaner dust bag, regardless of the angular position of the handle.

Referring again to the drawings, and to Figures 1 to 5, inclusive, in particular, a preferred embodiment of the invention is disclosed. The cleaner nozzle 1 is mounted upon a frame which is supported by spaced pairs of front and rear wheels 2, 2 and 3, 3, respectively. The driving motor 4 is positioned with its axis parallel to the nozzle 1, and its shaft carries at one end a pulley 5, and at its opposite end a suction-creating fan 6. A power-transmitting belt 7 connects the pulley 5 to a rotating agitator 8 within the nozzle 1, while the fan 6 is effective, in the operation of the cleaner, to create a reduced pressure in nozzle 1 through being directly connected thereto. The combination motor casing and fan chamber 9 carries the motor 4 and fan 6 and is itself rotatable about the motor axis through being provided with sealed bearings 10 and 11 at its opposite ends on the rearwardly extending side channels of the nozzle 1. The exhaust outlet 12 of the fan chamber is formed rigidly on the casing 9 and is provided at its end with a flange and bag-clamping means 13.

The handle of the cleaner is indicated by the reference character 14 and is rigidly connected to the casing 9, as shown in Figures 1 and 2. The incoming current leads 15 enter handle 14 near its upper end and are connected through a manually operable switch 16 before passing down the handle to be connected to the motor 4 in any suitable manner.

The cleaner dust bag 17 is provided with a ring 18 at its lower end which is adapted to seat on the flanged outer end of the exhaust outlet 12 and to be secured thereto in sealed relationship by the manually operable bag-clamping means 13. The open upper end of the bag is folded and held in a closed and sealed relationship by means of an enclosing U-shaped channel 19 which is supported by means of a spring 20, from the handle.

Rigidly secured to the bag ring 18 by rivets 24, 24 is an elongated expanding tubular muffler 21, each side of which makes approximately a 7 degree angle with the longitudinal axis. Muffler 21 in this embodiment comprises an outer metallic casing 22 and an inner liner or sleeve 23 of sound-absorbing material such as felt or sponge rubber which extends substantially the entire length of the outer body 22. At the end of the expanded muffler 21, which is clearly shown in Figure 4 to increase in cross-sectional area from the ring 18 to its outer end, is a collapsible valve 25, preferably of cloth or fabric. Valve 25 functions, in the operation of the machine, to prevent, by collapsing to close the end of the muffler, the return into the muffler of foreign matter by an air current set up by the bag back pressure when the suction-creating means or fan has ceased to rotate at the end of a cleaning operation.

The operation of the cleaner constructed in accordance with the present invention is easily understood. With the machine positioned upon the surface covering which is to be cleaned, the closing of the switch 16 by the operator causes the motor 4 to rotate pulley 5 and the suction-creating fan 6. Pulley 5 transmits its rotating torque through the belt 7 to the agitator 8 within the nozzle, and the suction-creating fan 6 withdraws air from the nozzle and exhausts it through the exhaust outlet 12 into the muffler 21 through which it passes into the bag 17 where the suspended foreign matter is removed, the air filtering back into the surrounding atmosphere. Because the muffler 21 is lined with a sound-absorbing material and because it expands in cross-sectional area gradually from the mouth of the exhaust outlet proper 12 to its own end, the muffler serves to reduce the noise-creating vibration in the air exhausted from the cleaner. Because the handle, the exhaust outlet, the bag and the motor casing pivot as a unit about the axis of the motor 4, no relative movement takes place therebetween. This relationship is essential as rigid muffler 21 must be relatively long in order to be efficient and if the cleaner were of the usual type in which handle 14 pivots relative to the body of the machine and the bag 17 bends about its point of attachment to the cleaner body as the handle pivots, it would not be feasible to use the elongated muffler element.

Upon the use of the machine for a reasonable length of time, it becomes necessary for the bag 17 to be cleaned and the foreign matter removed therefrom. To accomplish this operation it is necessary only to remove manually the bag ring 18 from the securing means 13, 13 and to detach the upper end of the bag from the supporting channel 19. The bag at its upper end can then be pulled down over the muffler into a reversed relationship in which the interior of the bag is exposed and the foreign matter can then be removed.

Figure 6:
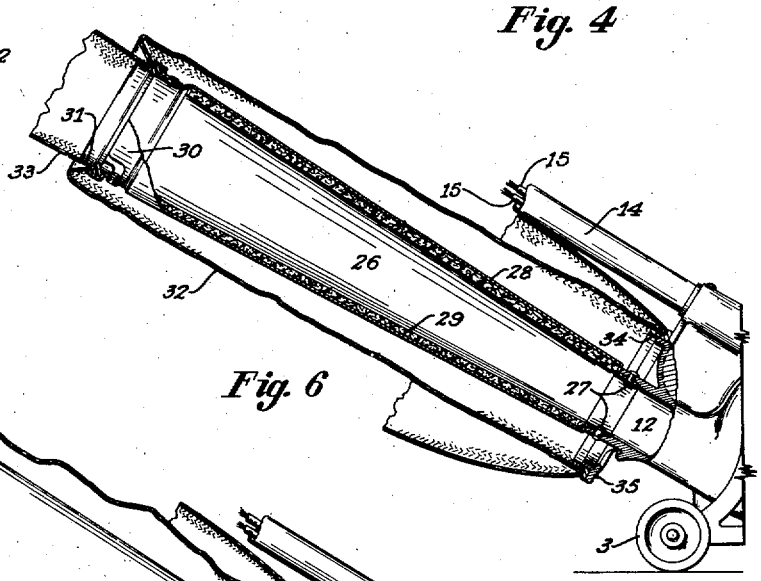
Figure 6 is a section through a second preferred embodiment of the invention in which the muffler is attached permanently to the body of the suction cleaner.
Figure 7:
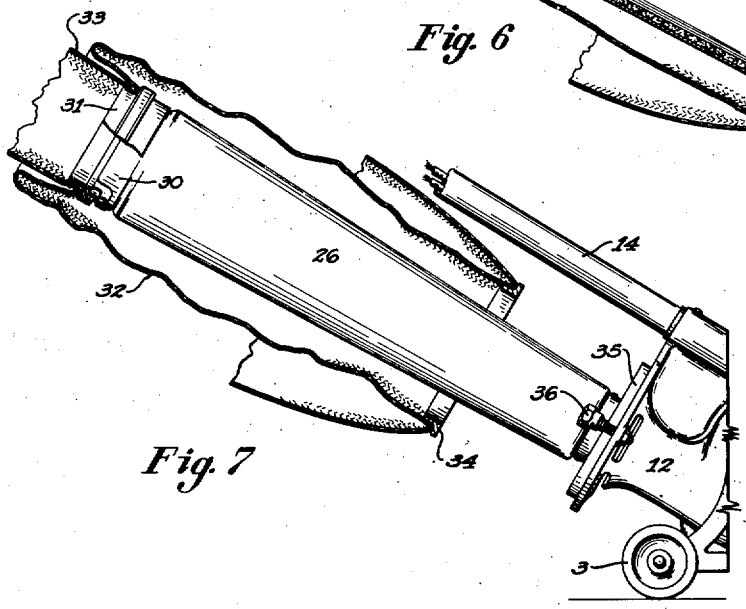
Figure 7 illustrates the manner of removing the dust bag in the embodiment illustrated in Figure 6.
Figure 8:
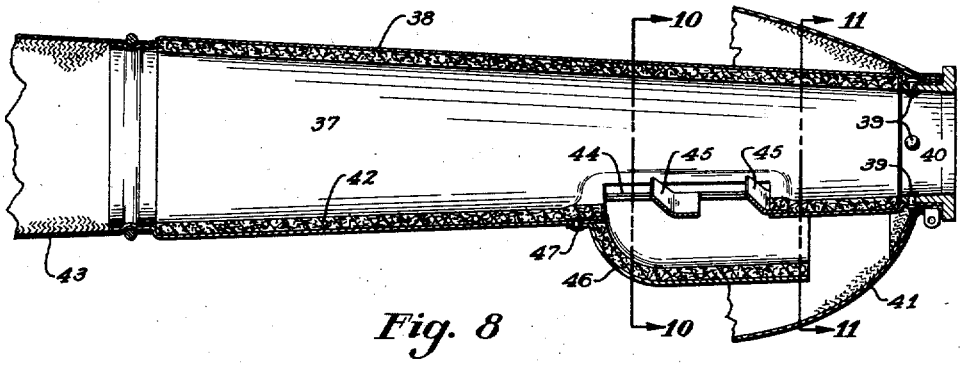
Figure 8 is a cross-section through a muffler element constructed in accordance with a third preferred embodiment of the invention.
Figure 9:
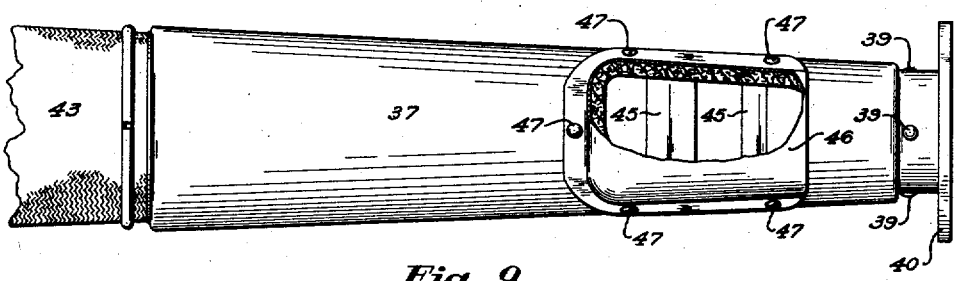
Figure 9 is a bottom view of the element shown in Figure 8.
Figure 11:
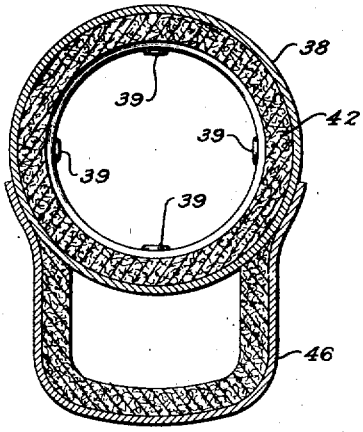
Figure 11 is a section through the muffler element of Figure 8 upon the line 11—11.
Figure 10:
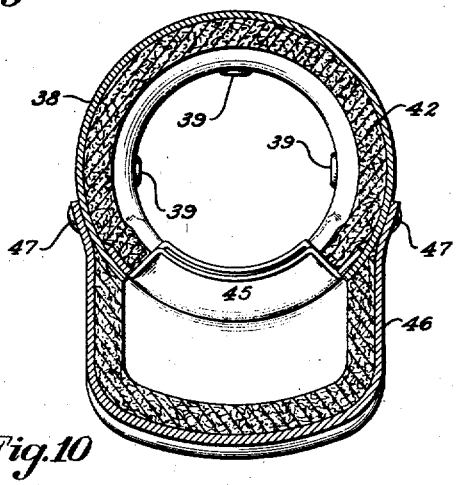
Figure 10 is a section through the muffler of Figure 8 upon the line 10—10.

Referring now to Figures 6 and 7, a second preferred embodiment of the invention is disclosed. In this embodiment the muffler is indicated by the reference character 26 and is secured integrally to the exhaust outlet 12 of the cleaner by means of rivets 27, 27. The muffler again comprises an outer casing of metal 28 and an inner sleeve of sound-deadening material 29, the casing, as in the first embodiment, increasing in cross-sectional area from the exhaust outlet proper 12 to its end. At its upper end the muffler is provided with a seat 30 which is adapted to receive and seat an enclosing bag ring 31 through a bayonet pin and groove relationship. The dust bag 32 is open to the interior of the muffler through the bag ring 31 and a bag valve 33 of the flexible fabric type is carried by and is removable with the ring. According to the present embodiment the bag 32 telescopes downwardly and encloses the muffler 26 being provided with a second lower bag ring 34 at a point adjacent the outer end of the exhaust outlet 12. Bag-ring-receiving-means including a flange 35 and manually operable clamping nuts 36 are provided at that point on the cleaner casing and serve to seat and lock the ring 34 in place. This construction has the advantage that the bag may be removed without removing the muffler by disconnecting the two bag rings 34 and 31. The upper end of the bag is supported from the cleaner handle as in the first embodiment.

Referring now to Figures 8 to 11, inclusive, a third preferred embodiment of the invention is disclosed. According to this embodiment of the invention the muffler comprises an outer metallic sleeve 38 which is again fixedly secured by rivets 39, 39 to a bag ring 40. The dust bag, which is indicated by the reference character 41, encloses the muffler and is also secured to the bag ring 40. As in the previous embodiments, an inner lining 42 of sound-deadening material is provided with extends the entire length of the muffler which is again of the expanding type. Also, as in the previous embodiments, a flexible fabric valve 43 to prevent movement of air in the wrong direction in the muffler is provided at the end thereof. In the present embodiment of the invention, however, an escape leak opening 44 is provided in the underside of the muffler near the base thereof. This opening extends through both the outer metallic casing and the liner. Transversely extending across this opening 44 are upwardly sloping deflectors or baffles 45, 45 which are spaced as clearly illustrated in Figure 8 and which aid in preventing incoming foreign matter entering the opening. Immediately below the opening 44 is provided a pocket 46 which is formed, in the manner of the body of the muffler, of an outer metallic casing and sound-deadening material. Pocket 46 is formed rigidly on the muffler 37 being attached thereto by rivets 47, 47 and is so shaped that its main portion is spaced from and faces the opening 44 to provide a downwardly facing opening.

In the operation of a cleaner embodying this last embodiment of the invention the muffler functions, as in the previous embodiments, to reduce the noise created by the high velocity air flow. The muffler is often positioned at a considerable angle to the vertical, as indicated in Figures 6 and 7 showing the second embodiment, and at such times heavy particles of foreign matter may fail to reach the top of the muffler to enter the bag proper and instead return to the interior of the machine itself. In the muffler constructed in accordance with the present invention, these heavy particles rolling down the bottom of the muffler fall through the opening 44, or are deflected therethrough by the deflectors 45, 45, and into the pocket 46. These particles then fall from the open end of the pocket into the lower end of the dust bag.

I claim:

1. In a suction cleaner, a nozzle, rotary suction-creating means connected to said nozzle and movable with respect thereto about its axis of rotation, a dust bag connected to the exhaust of said suction-creating means, an elongated expanding muffler connected directly to the exhaust of said suction-creating means and open at its expanded end to said dust bag, and a handle connected to said suction-creating means and supporting said dust bag, said suction-creating means, said bag and muffler, and said handle pivoting as a unit relative to said nozzle.

2. In a suction cleaner including suction-creating means, an elongated metal tube connected to the exhaust of said means, said tube expanding in cross sectional area from said exhaust to the opposite end, and a lining of sound-absorbing material in said tube, said tube and said lining functioning as a muffler to reduce vibration in cleaning air exhausted thereinto by said suction-creating means.

3. In a suction cleaner, a nozzle, suction-creating means connected to said nozzle, a handle, a dust bag, an elongated muffler positioned in said bag and connected to the exhaust of said means, said muffler having an escape opening near its lower end permitting particles of foreign material to drop from said muffler into said bag, said handle, muffler and bag being pivotally mounted to move as a unit relative to said nozzle.

4. In a suction cleaner, suction-creating means, a dust bag, an expanding air-conveying conduit including vibration absorbing means connected to the exhaust outlet of said suction-creating means to convey air into said dust bag.

5. In a suction cleaner, suction-creating means, a dust bag removably connected to said means, and an air-conveying conduit including vibration-absorbing means positioned in said bag to conduct air from said exhaust into said bag, said conduit increasing in cross-sectional area from said exhaust.

6. In a suction cleaner, a body including suction-creating means, an air-conveying tube rigidly attached to said means and expanding in cross-sectional area from said means, a dust bag removably secured to the outer end of said tube and adapted to receive air exhausted therefrom, said bag telescopically enclosing said tube and being removably secured to said body adjacent the inner end of said tube.

7. The construction recited in the preceding claim in which said tube includes sound-absorbing material.

8. The construction recited in the second preceding claim in which said bag is secured to said body by a ring of diameter larger than the diameter of the outer end of said tube to permit its displacement thereover.

9. In a suction cleaner muffler, an elongated expanding metallic tube forming a passageway for air exhausted from a cleaner, a sound-deadening lining of sponge rubber inside said tube exposed directly to a flow of air therethrough.

10. In a suction cleaner, a nozzle, rotary suction-creating means connected to said nozzle and removable with respect thereto about its axis of rotation, a dust bag connected to the exhaust of said suction-creating means, an elongated expanding tube connected directly to the exhaust of said suction-creating means and open at its expanded end to said dust bag, and a handle connected to said suction-creating means and supporting said dust bag, said suction-creating means, said bag and tube, and said handle pivoting as a unit relative to said nozzle.

11. In a suction cleaner, the combination of suction-creating means having an exhaust outlet, a tubular member forming a sound-reducing extension of said outlet and having an escape opening adjacent said outlet and adapted to permit the passage of particles of foreign material therethrough, and a dirt bag enclosing said tubular member and communicating with said outlet through the open end and said escape opening of said tubular member.

12. In a suction cleaner, suction-creating means, an air passageway connected to said suction-creating means including a muffler element formed with an exhaust opening at its end and with an escape opening intermediate its ends, and a dirt-filtering member to receive air from said suction-creating means enclosing said muffler and interiorly open thereto through said exhaust and escape openings.

STANLEY R. CUMMINGS.